(12) United States Patent
Bleckmann et al.

(10) Patent No.: US 11,112,870 B2
(45) Date of Patent: Sep. 7, 2021

(54) ELECTROMAGNETIC FEEDBACK ACTUATOR FOR AN OPERATING ELEMENT AND ARRANGEMENT HAVING AT LEAST ONE ELECTROMAGNETIC FEEDBACK ACTUATOR

(71) Applicant: Leopold Kostal GmbH & Co. KG, Luedenscheid (DE)

(72) Inventors: Michael Bleckmann, Schwerte-Ergste (DE); Daniel Klagges, Witten (DE); Carl Christian Lexow, Dortmund (DE); Kai Brensel, Witten (DE)

(73) Assignee: KOSTAL Automobil Elektrik GmbH & Co. KG, Luedenscheid (DE)

( * ) Notice: Subject to any disclaimer, the term of this patent is extended or adjusted under 35 U.S.C. 154(b) by 97 days.

(21) Appl. No.: 16/186,669

(22) Filed: Nov. 12, 2018

(65) Prior Publication Data

US 2019/0079585 A1 Mar. 14, 2019

Related U.S. Application Data

(63) Continuation of application No. PCT/EP2017/061341, filed on May 11, 2017.

(30) Foreign Application Priority Data

May 14, 2016 (DE) ..................... 10 2016 005 926.5

(51) Int. Cl.
*G06F 3/01* (2006.01)
*H01H 13/85* (2006.01)
(Continued)

(52) U.S. Cl.
CPC ............. *G06F 3/016* (2013.01); *G06F 3/041* (2013.01); *H01F 7/081* (2013.01); *H01F 7/126* (2013.01);
(Continued)

(58) Field of Classification Search
CPC .......... G06F 3/016; G06F 3/041; G06F 3/044; H01F 2007/086; H01F 7/081;
(Continued)

(56) References Cited

U.S. PATENT DOCUMENTS 6,094,118 A * 7/2000 Bulgatz ..................... F01L 9/04
335/278
9,182,825 B2 11/2015 Schneider et al.
(Continued)

FOREIGN PATENT DOCUMENTS

CN 104508596 A 4/2015
DE 102006011100 A1 11/2006
(Continued)

OTHER PUBLICATIONS

European Patent Office, International Search Report for International Application No. PCT/EP2017/061341, dated Aug. 10, 2017.
(Continued)

*Primary Examiner* — Kenneth Bukowski
(74) *Attorney, Agent, or Firm* — Brooks Kushman P.C.

(57) ABSTRACT

An electromagnetic feedback actuator for an operating element includes an electromagnet, a magnet armature, and a metal body. The electromagnet includes a magnetic coil and a magnetic core. The magnet armature is moveable relative to the electromagnet. The operating element includes an actuating element (e.g., touch surface, sensor surface). The magnet armature is mechanically coupled to the operating element to provide a force pulse to the operating element in response to contact with, or pressure actuation on, an actuating element of the operating element. The electromagnet is arranged in the metal body. The metal body, in integral fashion, forms the magnet armature, a magnet yoke for the magnetic core of the electromagnet, and a holder for the electromagnet. An arrangement includes at least one such
(Continued)

electromagnetic feedback actuator coupled to an operating element.

16 Claims, 3 Drawing Sheets

(51) Int. Cl.
*G06F 3/041* (2006.01)
*H01F 7/08* (2006.01)
*H01F 7/126* (2006.01)
*H01F 7/14* (2006.01)
*H01H 3/00* (2006.01)
*G06F 3/044* (2006.01)

(52) U.S. Cl.
CPC .............. *H01F 7/14* (2013.01); *H01H 13/85* (2013.01); *G06F 3/044* (2013.01); *H01F 2007/086* (2013.01); *H01H 2003/008* (2013.01); *H01H 2215/05* (2013.01); *H01H 2239/074* (2013.01)

(58) Field of Classification Search
CPC ........... H01F 7/126; H01F 7/14; H01H 13/85; H01H 2003/008; H01H 2215/05; H01H 2239/074
USPC ......................................................... 345/691
See application file for complete search history.

(56) References Cited

U.S. PATENT DOCUMENTS

| 9,373,993 | B2 | 6/2016 | Irwin | |
|---|---|---|---|---|
| 9,672,994 | B2 | 6/2017 | Bleckmann et al. | |
| 2007/0257756 | A1* | 11/2007 | Matsumoto | H01F 7/081 335/229 |
| 2011/0037546 | A1 | 2/2011 | Marie | |
| 2011/0234498 | A1* | 9/2011 | Gray | G06F 3/04886 345/168 |
| 2014/0009005 | A1* | 1/2014 | Irwin | H02K 33/00 310/12.04 |
| 2015/0009178 | A1 | 1/2015 | Schneider et al. | |
| 2016/0035504 | A1 | 2/2016 | Bleckmann et al. | |
| 2019/0079585 | A1* | 3/2019 | Bleckmann | G06F 3/041 |

FOREIGN PATENT DOCUMENTS

| DE | 102013006414 | A1 | 10/2014 |
|---|---|---|---|
| DE | 112013003425 | T5 | 4/2015 |
| EP | 2802965 | A2 | 11/2014 |
| EP | 3455868 | B1 | 3/2020 |

OTHER PUBLICATIONS

German Patent and Trademark Office, German Search Report for corresponding German Patent Application No. 10 2016 005 926.5 dated Feb. 16, 2017.
The State Intellectual Property Office of People's Republic of China, Search Report for Chinese Patent Application No. 2017800286320, dated Apr. 8, 2018.
The State Intellectual Property Office of People's Republic of China, First Chinese Office Action for Chinese Patent Application No. 201780028632.0, dated Apr. 18, 2019.
The State Intellectual Property Office of People's Republic of China, Second Chinese Office Action for Chinese Patent Application No. 201780028632.0, dated Sep. 19, 2019.
The International Bureau of WIPO, International Preliminary Report on Patentability for International Application No. PCT/EP2017/061341, dated Nov. 20, 2018.
The State Intellectual Property Office of People's Republic of China, Chinese Search Report for corresponding Chinese Patent Application No. 201780028632.0, dated Mar. 16, 2020.
The State Intellectual Property Office of People's Republic of China, The Third Office Action for corresponding Chinese Patent Application No. 201780028632.0 dated Dec. 17, 2019.
The State Intellectual Property Office of People's Republic of China, Notification to Grant Patent Right for Invention for corresponding Chinese Patent Application No. 201780028632.0, dated Mar. 4, 2020.

* cited by examiner

ELECTROMAGNETIC FEEDBACK ACTUATOR FOR AN OPERATING ELEMENT AND ARRANGEMENT HAVING AT LEAST ONE ELECTROMAGNETIC FEEDBACK ACTUATOR

CROSS-REFERENCE TO RELATED APPLICATIONS

This application is a continuation of International Application No. PCT/EP2017/061341, published in German, with an International filing date of May 11, 2017, which claims priority to DE 10 2016 005 926.5, filed May 14, 2016; the disclosures of which are hereby incorporated in their entirety by reference herein.

TECHNICAL FIELD

The present invention relates to an electromagnetic feedback actuator for an operating element, the feedback actuator having an electromagnet, including a magnetic coil and a magnetic core, and a magnet armature that is movable relative to the electromagnet, the magnet armature is mechanically coupleable to the operating element to provide at least one force pulse to the operating element in response to contact with, or pressure actuation of, an actuating element of the operating element. The present invention further relates to an arrangement having at least one electromagnetic feedback actuator of this type.

BACKGROUND

Operating assemblies of electrical devices, particularly those bearing touch-sensitive actuating surfaces, often have units for haptic feedback of an actuation to the user. The signaling generally takes place via at least one force pulse that is transmitted to the actuating surface. An electromagnetic feedback actuator may be used for generating the force pulse. The feedback actuator includes an electromagnet and a magnet armature. The electromagnet is made up of a magnetic coil and a magnetic core. The magnet armature is movable relative to the electromagnet. The magnet armature is typically designed either as a linearly movable lifting armature or solenoid plunger or as a rotatably supported hinged armature.

The magnet armature is suitably coupled to the actuating surface for the signaling to be haptically detectable. For example, the magnet armature is coupled to the actuating surface via a rigid or an elastic mechanical connection or by a direct adjacent arrangement by means of which the magnet armature acts on the actuating surface during a deflection.

Operating assemblies having an electromagnetic feedback actuator are known in various designs. For example, DE 10 2009 007 243 A1 describes a haptic operating device having an electromagnetic feedback actuator. By touching the touch area of a touchpad, a switching signal can be triggered and the touchpad is movable in a specified rhythm in the plane of the touchpad by a magnetic motion drive coupled to the touchpad. The magnetic motion drive has a hinged magnet armature and an armature plate. The magnet armature has an iron core that is enclosed by a magnetic coil. The armature plate is pivotably mounted about a pivot axis.

In many cases an electromagnetic feedback actuator is adapted to the shape of an operating element. A problem not satisfactorily solved thus far is to provide an electromagnetic feedback actuator specifically for haptic signaling, in which the feedback actuator is versatile for use in a variety of applications, has a simple design and is cost-effective to manufacture, is easily scalable regarding its force and size so that it may be manufactured in various sizes, and is compact.

SUMMARY

An object, therefore, is an electromagnetic feedback actuator for haptic signaling in which the feedback actuator has the above-stated properties.

An embodiment provides an electromagnetic feedback actuator for an operating element. The feedback actuator includes an electromagnet and a magnet armature. The electromagnet includes a magnetic coil and a magnetic core. The magnet armature is moveable relative to the electromagnet. The operating element includes at least one actuating element (e.g., touch surface, sensor surface). The magnet armature is mechanically coupled to the operating element to provide at least one force pulse to the operating element in response to contact with, or pressure actuation on, an actuating element of the operating element. The electromagnet is arranged in a metal body. The metal body, at the same the electromagnet is arranged therein, in integral fashion, forms the magnet armature, a magnet yoke for the magnetic core of the electromagnet, and a holder for the electromagnet to be held in its arranged position in the metal body.

Another embodiment provides an arrangement (i.e., an operating assembly) having at least one such electromagnetic feedback actuator that is coupled to an operating element.

In carrying out at least one of the above and/or other objects, an electromagnetic feedback actuator for an operating element is provided. The feedback actuator includes an electromagnet, a magnet armature, and a metal body. The electromagnet has a magnetic coil and a magnetic core. The magnet armature is movable relative to the electromagnet. The magnet armature is mechanically coupled to the operating element to provide at least one force pulse to the operating element in response to contact with or pressure actuation of an actuating element of the operating element. The electromagnet is situated on the metal body which in one piece forms the magnet armature, a magnet yoke for the magnetic core, and a holder for holding the electromagnet.

A plate-like section of the metal body may form the magnet armature. The plate-like section is elastically connected to another section of the metal body such that the plate-like section is movable. The plate-like section is magnetically attracted to the electromagnet during energization of the electromagnet such that the plate-like section moves from a starting position near the electromagnet toward the electromagnet during energization of the electromagnet and the plate-like section moves away from the electromagnet back to the starting position after energization of the electromagnet ceases. In response to contact with or pressure actuation of an actuating element of the operating element, the electromagnet is energized to cause the plate-like section to move from the starting position toward the electromagnet and energization of the electromagnet is then ceased to cause the plate-like section to move away from the electromagnet back to the starting position whereby, as the plate-like section is mechanically coupled to the operating element, the movements of the plate-like section are haptically detectable on the operating element as shaking or vibration.

Further, in carrying out at least one of the above and/or other objects, an assembly is provided. The assembly includes an operating element having at least one actuating element and at least one of the electromagnetic feedback actuator.

Also, in carrying out at least one of the above and/or other objects, another electromagnetic feedback actuator for an operating element is provided. This feedback actuator includes an electromagnet and a metal body. The electromagnet has a magnetic coil and a magnetic core. The metal body has a plate that is elastically connected to a remainder of the metal body such that the plate is movable relative to the electromagnet. The plate is mechanically coupled to the operating element to provide at least one force pulse to the operating element in response to contact with or pressure actuation of an actuating element of the operating element. The electromagnet is situated on the metal body which unitarily forms (i) a movable magnet armature in a form of the plate, (ii) a magnet yoke for the magnetic core, and (iii) a holder for holding the electromagnet.

In embodiments, the electromagnet is situated on a metal body. The metal body, in one piece, at the same time forms the magnet armature of the electromagnet, a magnet yoke for the magnetic core of the electromagnet, and a holder for the electromagnet. Particularly, the metal body includes a resilient armature plate which forms the magnet armature of the electromagnet.

The feedback actuator is thus characterized by a relatively simple design, since besides the electromagnet the feedback actuator is made up of only one additional part. This one additional part is the metal body. Installation and adjustment of mechanical pivot bearings, separate spring elements, or the like for a magnet armature may be dispensed with.

Further advantageous properties of the feedback actuator are high rigidity in the unloaded state, small space requirements, low electrical power consumption, and low scattering of the actuator forces.

The metal body may be manufactured relatively easily and cost-effectively as a stamped/bent part.

Electrical or magnetic properties of the feedback actuator, such as the tightening torque, may advantageously be adjusted by simply bending the metal body into shape. Such an adjustment may advantageously be provided during installation of the magnetic core of the electromagnet on the metal body.

In an operating assembly having at least one electromagnetic feedback actuator, the resilient armature plate may at the same time advantageously form an integral part of a capacitive or inductive sensor.

BRIEF DESCRIPTION OF THE DRAWINGS

The present invention is described below with reference to the drawings and explained in greater detail. In the drawings.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
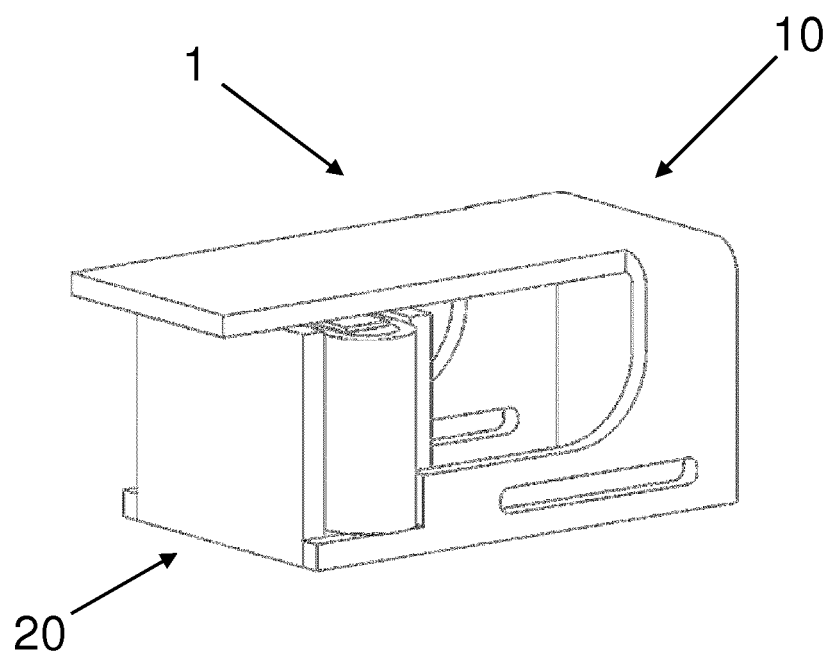
FIG. 1 illustrates an electromagnetic feedback actuator.
Figure 2:
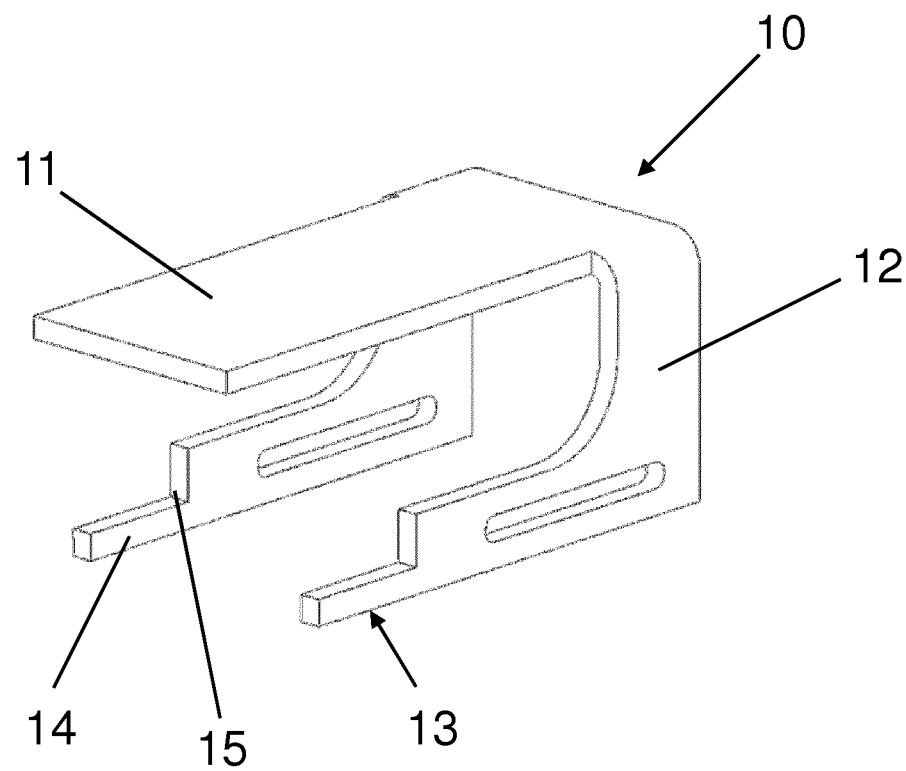
FIG. 2 illustrates a metal body of the feedback actuator as an individual part.

Referring now to FIG. 1, an electromagnetic feedback actuator 1 is shown. Feedback actuator 1 includes a metal body 10 and an electromagnet 20. Metal body 10 is illustrated in FIG. 2 as an individual part. Electromagnet 20 is illustrated in FIG. 3 as an individual part.

Figure 3:
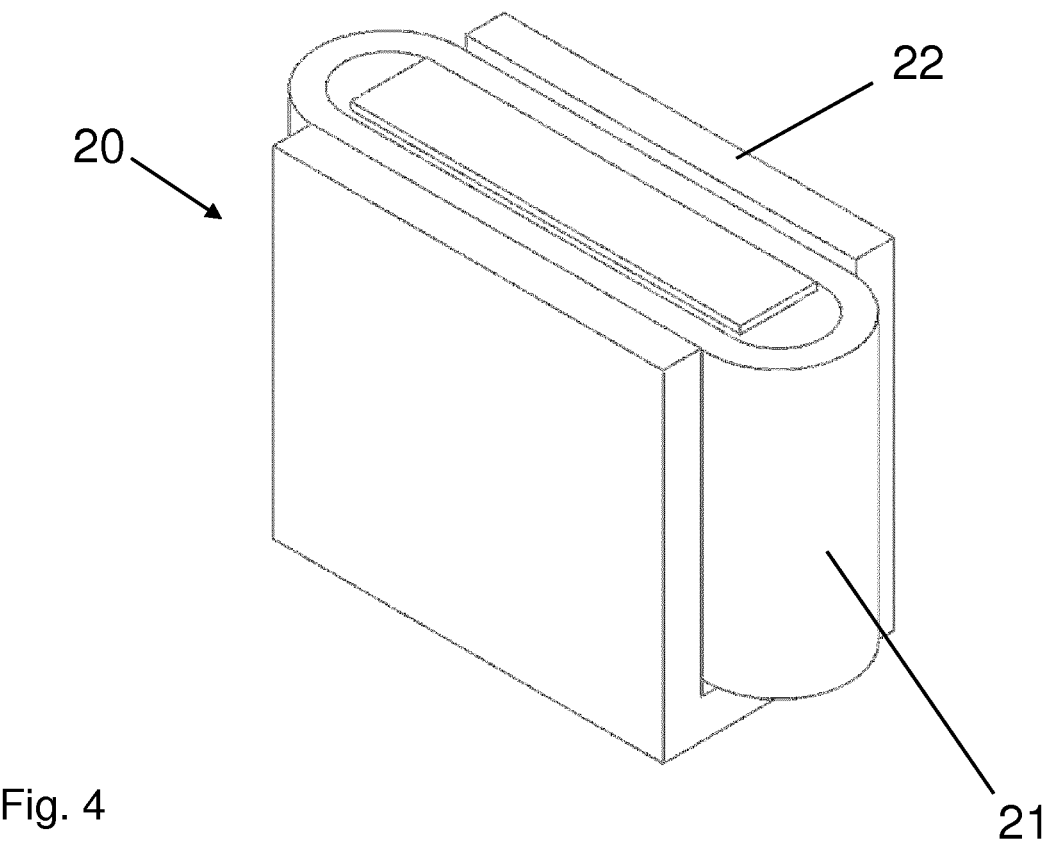
FIG. 3 illustrates an electromagnet of the feedback actuator as an individual part.

As shown in FIG. 3, electromagnet 20 includes a magnetic coil 21 and a magnetic core 22. Magnetic coil 21 has an oval shape and magnetic core 22 has an E-shape. The middle leg of magnetic core 22 is inserted through the middle spacing of magnetic coil 21. The two outer legs of magnetic core 22 enclose the two longitudinal sides of magnetic coil 21. The oval shape of magnetic coil 21, which is attached closely to E-shaped magnetic core 22, allows a relatively strong and compact design of electromagnet 20.

As shown in FIG. 2, metal body 10 has a one-piece (i.e., unitary) design. Metal body 10 is preferably formed as a stamped/bent part. For manufacture of metal body 10, a shaped part is initially punched out of a flat metal sheet. The shaped part has the shape of a narrow rectangular plate 11 with two L-shaped side parts 12 molded onto its longitudinal sides. Plate 11 has a narrow side that is relatively short compared to its longitudinal extension. In a subsequent manufacturing step, L-shaped side parts 12 are each bent by 90° with respect to plate 11 so that side parts 12 ultimately face one another in parallel.

Free end sections of side parts 12 taper off into narrow pin-shaped moldings 14. Pin-shaped moldings 14 form retaining sections 13 as holders for holding electromagnet 20. Electromagnet 20 may thereby be attached to or arranged in metal body 10. A step 15 whose presence assists with the precisely positioned attachment of electromagnet 20 to metal body 10 is provided in each case between retaining sections 13 and the other sections of side parts 12.

In FIG. 1, electromagnet 20 is attached to metal body 10 to form the assembled feedback actuator 1. Plate 11 of metal body 10 is situated at a starting position adjacent to the top, open side of magnetic core 22. Side parts 12 of metal body 10 are in physical contact with bottom portions of the lateral sides of magnetic core 22.

Metal body 10 is made of a ferromagnetic material. As such, side parts 12 of metal body 10 in physical contact with the bottom portions of the lateral sides of magnetic core 22 form magnetically conductive magnet yokes of electromagnet 20.

Plate 11 of metal body 10 is connected at its narrow side in one piece to side parts 12 of metal body 10. Consequently, plate 11 at its freestanding section is somewhat elastically flexible compared to the remainder of metal body 10. As such, plate 11 is elastically movable relative to the remainder of metal body 10.

As noted, plate 11 is situated at a starting position near the open side of magnetic core 22 of electromagnet 20. In the starting position, plate 11 is relaxed and is stationary in place.

As plate 11 is near the open side of magnetic core 22, the plate is magnetically attracted to electromagnet 20 during energization of the electromagnet. The energization of electromagnet 20 involves applying an electrical current to magnetic coil 21. Plate 11 elastically moves from the starting position toward electromagnet 20 during energization of the electromagnet. After energization of electromagnet 20 ceases, plate 11 elastically moves away from the electromagnet back to the starting position.

Plate 11 thus advantageously fulfills the function of a movable magnet armature. As such, plate 11 is a magnet armature plate. Magnet armature plate 11 does not utilize a pivot bearing or elastic spring elements as separate components. This contributes significantly to achieving a particularly simple and cost-effective design of feedback actuator 1.

For assembling feedback actuator 1, magnetic core 22 of electromagnet 20 is joined to retaining section 13 of metal body 10 by adhesive bonding, welding, screwing, or crimping.

The distance between the starting position of magnet armature plate 11 and the open side of magnetic core 22 may be adjusted during the joining operation. However, the air gap between magnet armature plate 11 and magnetic core 22 may still be subsequently set by bending magnet armature plate 11 relative to side parts 12 of metal body 10.

Figure 4:
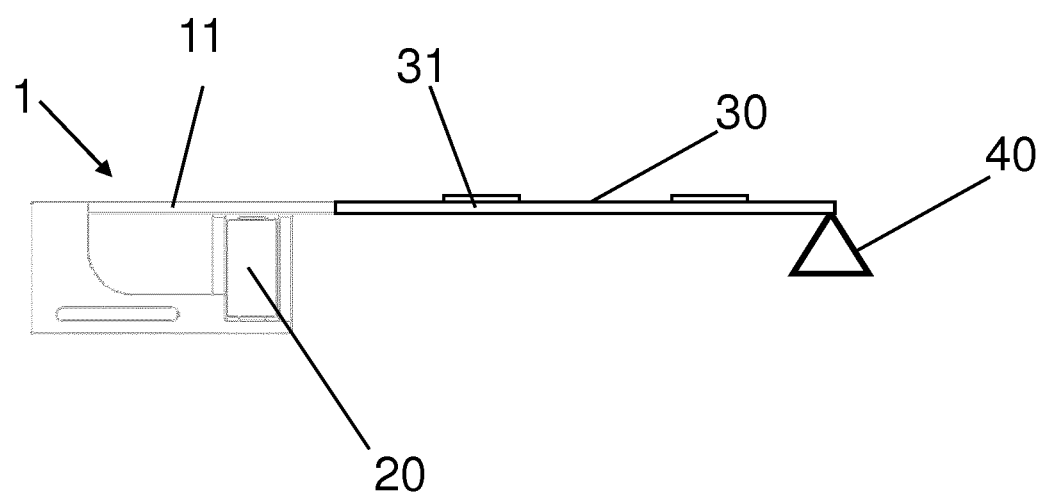
FIG. 4 is a schematic illustration of an arrangement having an electromagnetic feedback actuator and an operating element.

Referring now to FIG. 4, an arrangement (i.e., an operating assembly) having feedback actuator 1 and an operating element 30 is shown schematically. Operating element 30 is a flat operating element with one or more touch surfaces 31. Together with an electronics control system (not shown), touch surfaces 31 form actuating elements for activating operating functions. Operating element 30 may have a design as an actual touchscreen, for example.

Operating element 30 is coupled to magnet armature plate 11. The coupling may have either a rigid design or, via a coupling element (not shown), an elastic design, depending on the requirements for the haptics. The side of operating element 30 opposite from the coupling side is supported to be movable, for example on a pivot bearing 40.

The touching of a touch surface 31 of operating element 30 is detected by the electronics control system. The electronics control system controls electromagnet 20 in response to touch surface 31 being touched. Particularly, electromagnet 20 is energized to cause magnet armature plate 11 to displace from its starting position toward the electromagnet. The energization is then ceased to cause magnet armature plate 11 to displace away from electromagnet 20 back to its starting position. As magnet armature plate 11 is mechanically coupled to operating surface 30, the movements of the magnet armature plate are haptically detectable on the operating surface. The energization of electromagnet 20 may be done once or repeatedly such that the movements of magnet armature plate 11 are haptically detectable on operating surface 30 as shaking or vibration.

Since feedback actuator 1 as described herein may be compactly and cost-effectively manufactured, for an operating assembly having multiple identical or different operating elements it is also advantageously possible to associate a separate feedback actuator with each operating element. An exemplary embodiment of an operating assembly in this regard is schematically illustrated in FIG. 5.

Figure 5:
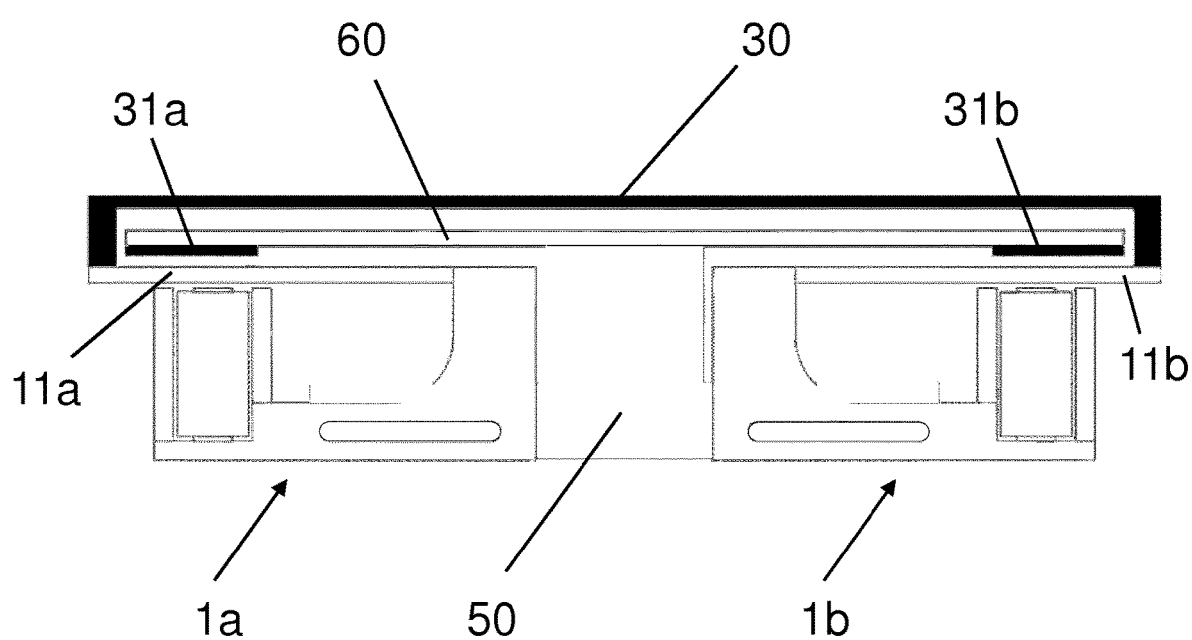
FIG. 5 is a schematic illustration of an arrangement having two electromagnetic feedback actuators and an operating element.

Referring now to FIG. 5, an operating assembly having two electromagnetic feedback actuators 1a, 1b and an operating element 30 is shown schematically. Operating element 30 has a planar form. Feedback actuators a, 1b are laterally mounted on a base 50 such that free end sections of their armature plates 11a, 11b extend in the direction away from the base. A circuit board 60 is fastened to the top side of base 50. Circuit board 60 almost completely covers armature plates 11a, 11b. A gap or intermediate space is between circuit board 60 and armature plates 11a, 11b.

Sensor surfaces 31a, 31b are mounted on circuit board 60 adjacent to armature plates 11a, 11b, respectively. Particularly, sensor surfaces 31a, 31b are mounted on the side of circuit board 60 facing armature plates 11a, 11b at their respective end sections. Sensor surfaces 31a, 31b can capacitively or inductively detect changes in distance from armature plates 11a, 11b, respectively.

An edge section of operating element 30 is coupled in each case to the free ends of armature plates 11a, 11b. Even a small application of force to the surface of operating element 30 may cause a vertical deflection of an armature plate 11a, 11b. This deflection is detected by the associated sensor surface 31a, 31b. The electrical signaling that takes place from a sensor surface 31a, 31b is evaluated by an electronics control system. The electronics control system subsequently triggers a provided switching function. Additionally, the electronics control system energizes the electromagnet of feedback actuator 1a, 1b associated with the deflected armature plate 11a, 11b so that armature plate 11a, 11b of the feedback actuator is attracted by the electromagnet, and the feedback actuator 1a, 1b generates haptic feedback for the actuation that has taken place.

When force is applied in the middle of operating element 30, i.e., approximately above base 50, both armature plates 11a, 11b are deflected approximately at the same time, thus simultaneously resulting in haptic feedback by both feedback actuators 1a, 1b. Thus, for this operating assembly a total of three actuation options result which may be haptically well differentiated.

LIST OF REFERENCE NUMERALS 1, 1a, 1b feedback actuator
10 metal body
11, 11a, 11b (magnet) armature plate (magnet armature, rectangular plate)
12 side parts (magnet yokes)
13 retaining sections (holders)
14 pin-shaped moldings
15 step
20 electromagnet
21 magnetic coil
22 magnetic core
30 operating element
31, 31a, 31b actuating elements (touch surfaces, sensor surfaces)
40 pivot bearing
50 base
60 circuit board While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electromagnetic feedback actuator for an operating element, comprising: an electromagnet having a magnetic coil and a magnetic core;
    a magnet armature that is movable relative to the electromagnet, wherein the magnet armature is mechanically coupled to the operating element to provide at least one force pulse to the operating element in response to contact with or pressure actuation of an actuating element of the operating element;
a stamped, one-piece metal body including a plate-like structure that is elastically connected to a remainder of the metal body such that the plate-like structure is movable relative to the remainder of the metal body; and
wherein the electromagnet is situated on the metal body and the metal body in one piece forms the magnet armature, a magnet yoke for the magnetic core, and a holder for holding the electromagnet.

2. The electromagnetic feedback actuator of claim 1 wherein:
a plate-like section of the metal body forms the magnet armature.

3. The electromagnetic feedback actuator of claim 1 wherein: the plate-like section is magnetically attracted to the electromagnet during energization of the electromagnet such that the plate-like section moves from a starting position near the electromagnet toward the electromagnet during energization of the electromagnet and the plate-like section moves away from the electromagnet back to the starting position after energization of the electromagnet ceases.

4. The electromagnetic feedback actuator of claim 3 wherein:
in response to contact with or pressure actuation of an actuating element of the operating element, the electromagnet is energized to cause the plate-like section to move from the starting position toward the electromagnet and energization of the electromagnet is then ceased to cause the plate-like section to move away from the electromagnet back to the starting position whereby, as the plate-like section is mechanically coupled to the operating element, movements of the plate-like section are haptically detectable on the operating element as shaking or vibration.

5. The electromagnetic feedback actuator of claim 1 wherein:
the metal body includes a ferromagnetic material.

6. An assembly comprising:
an operating element having at least one actuating element; at least one electromagnetic feedback actuator, each electromagnetic feedback actuator having an electromagnet having a magnetic coil and a magnetic core;
a magnet armature that is movable relative to the electromagnet, wherein the magnet armature is mechanically coupled to the operating element to provide at least one force pulse to the operating element in response to contact with or pressure actuation of an actuating element of the operating element;
a stamped, one-piece metal body including a plate that is elastically connected to a remainder of the metal body such that the plate is movable relative to the remainder of the metal body; and
wherein the electromagnet is situated on the metal body and the metal body in one piece forms the magnet armature, a magnet yoke for the magnetic core, and a holder for holding the electromagnet.

7. The assembly of claim 6 wherein:
the operating element has at least one touch surface as the at least one actuating element.

8. The assembly of claim 6 wherein:
the operating element is a touchscreen.

9. The assembly of claim 6 wherein:
the magnet armature forms a portion of a capacitive or inductive sensor.

10. The assembly of claim 6 wherein: the plate is magnetically attracted to the electromagnet during energization of the electromagnet such that the plate moves from a starting position near the electromagnet toward the electromagnet during energization of the electromagnet and the plate moves away from the electromagnet back to the starting position after energization of the electromagnet ceases.

11. The assembly of claim 10 wherein:
in response to contact with or pressure actuation of an actuating element of the operating element, the electromagnet is energized to cause the plate to move from the starting position toward the electromagnet and energization of the electromagnet is then ceased to cause the plate to move away from the electromagnet back to the starting position whereby, as the plate is mechanically coupled to the operating element, movements of the plate are haptically detectable on the operating element as shaking or vibration.

12. The assembly of claim 6 wherein:
the metal body includes a ferromagnetic material.

13. An electromagnetic feedback actuator for an operating element, comprising:
an electromagnet having a magnetic coil and a magnetic core;
a stamped, one-piece metal body including a plate that is elastically connected to a remainder of the metal body such that the plate is movable relative to the remainder of the metal body, wherein the plate is mechanically coupled to the operating element to provide at least one force pulse to the operating element in response to contact with or pressure actuation of an actuating element of the operating element; and
wherein the electromagnet is situated on the metal body in an arranged position in which the plate of the metal body forms a magnet armature that is movable relative to the electromagnet and in which parts of the remainder of the metal body form a magnet yoke for the magnetic core, and a holder for holding the electromagnet in the arranged position.

14. The electromagnetic feedback actuator of claim 13 wherein:
the plate is magnetically attracted to the electromagnet during energization of the electromagnet such that the plate moves from a starting position near the electromagnet toward the electromagnet during energization of the electromagnet and the plate moves away from the electromagnet back to the starting position after energization of the electromagnet ceases.

15. The electromagnetic feedback actuator of claim 14 wherein:
in response to contact with or pressure actuation of an actuating element of the operating element, the electromagnet is energized to cause the plate to move from the starting position toward the electromagnet and energization of the electromagnet is then ceased to cause the plate to move away from the electromagnet back to the starting position whereby, as the plate is mechanically coupled to the operating element, movements of the plate are haptically detectable on the operating element as shaking or vibration.

16. The electromagnetic feedback actuator of claim 14 wherein:
the metal body includes a ferromagnetic material.

* * * * *